Nov. 15, 1955  R. HOLLINGSWORTH  2,723,866
BALL AND SOCKET TYPE HITCH
Filed Aug. 11, 1952

Witness
Edward P. Seeley

Inventor
Raphael Hollingsworth
by Talbert Dick & Adler
Attorneys

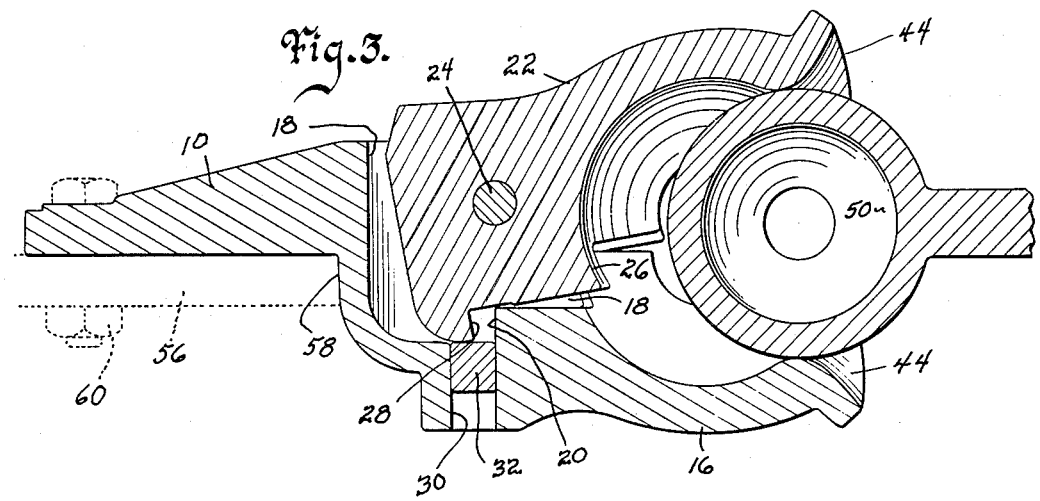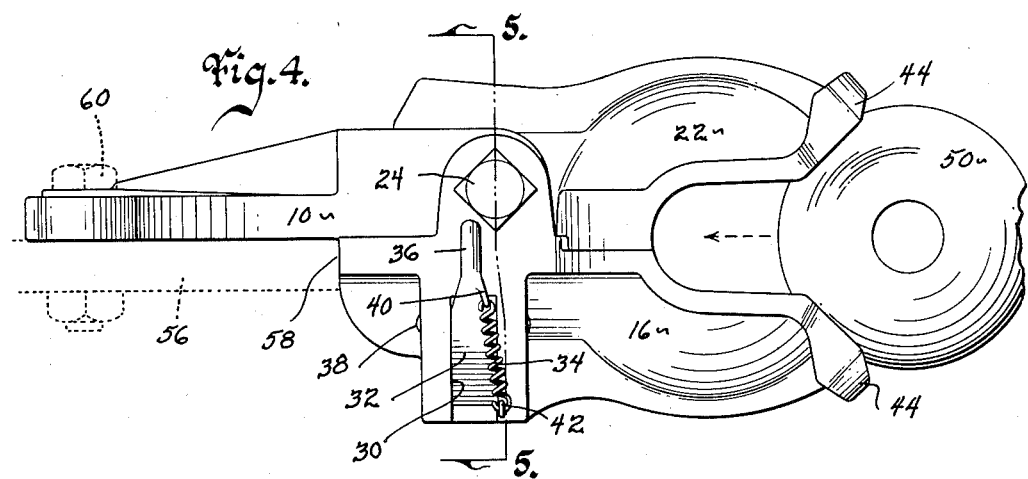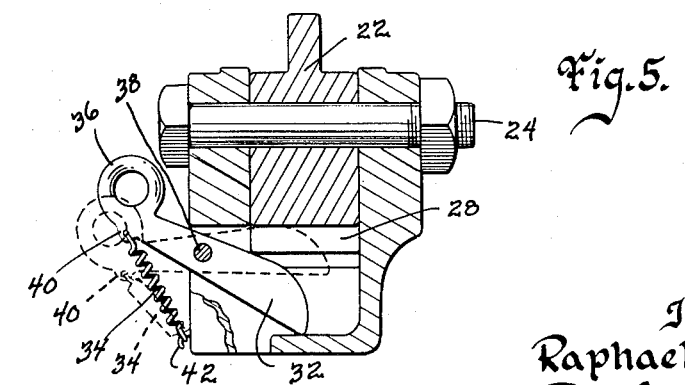

United States Patent Office 2,723,866
Patented Nov. 15, 1955

2,723,866
BALL AND SOCKET TYPE HITCH

Raphael Hollingsworth, Richland, Iowa

Application August 11, 1952, Serial No. 303,769

1 Claim. (Cl. 280—512)

My invention relates to the art of hitches and specifically is a novel type of ball and socket hitch that operates automatically.

The art of ball and socket hitches is old. Likewise, automatic hitches are well known in the art. I am also aware of the fact that there have been automatic hitches of the ball and socket type. Nevertheless, all of these hitches previously known have had shortcomings or drawbacks, the principal one of which is that they were unduly complex. Of the automatic ball and socket hitches known to me, all are provided with some type of cocking mechanism which necessarily makes the unit rather complex and, therefore, costly to manufacture. The automatic hitch which I have invented, however, is extremely simple and, in fact, in many ways not as complicated as some manually operated hitches. Nevertheless, this hitch retains all the advantages which are normally derived from manually operated hitches or some automatic hitches other than ball and socket type units. The reason that my hitch is so satisfactory in operation, while at the same time very simple in structure, is the fact that the sole control which is actuated by the operator is a spring loaded locking mechanism which must be held in the release position when either coupling or uncoupling, the other operations of the unit being accomplished automatically.

In view of the foregoing, it is the principal object in my invention to provide an automatic ball and socket type hitch.

It is a further object of my invention to provide a ball and socket type hitch that is extremely simple in construction and, therefore, inexpensive to manufacture and maintain.

It is a further object of my invention to provide a ball and socket type hitch having only two moving parts.

It is a further object of my invention to provide a ball and socket type hitch, the operation of which requires no special knowledge or training.

These and other objects will be apparent to those skilled in the art.

Figure 1:
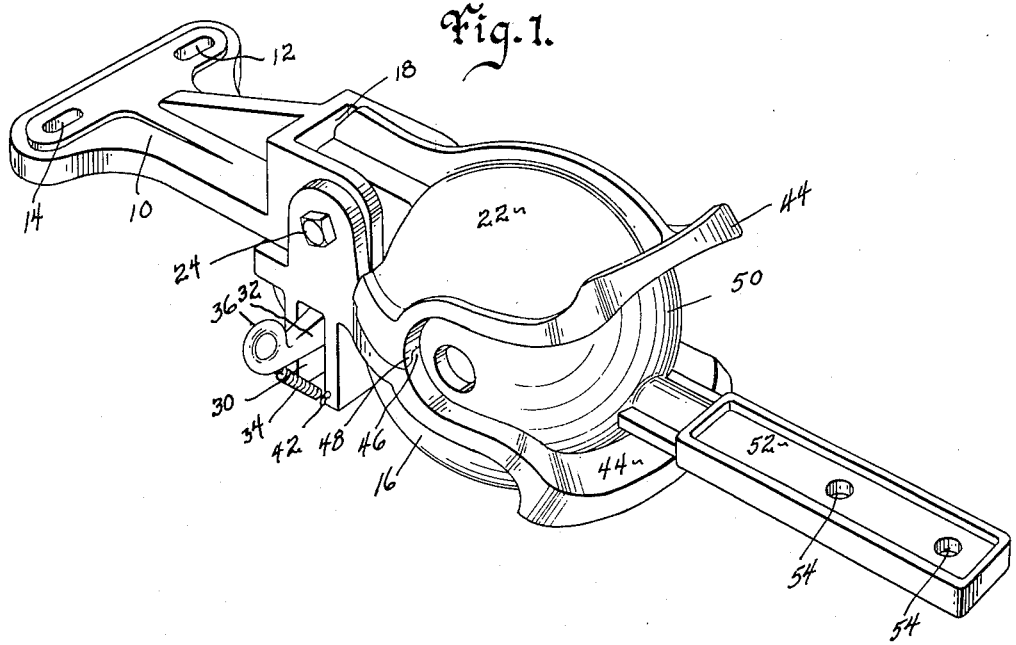
Figure 2:
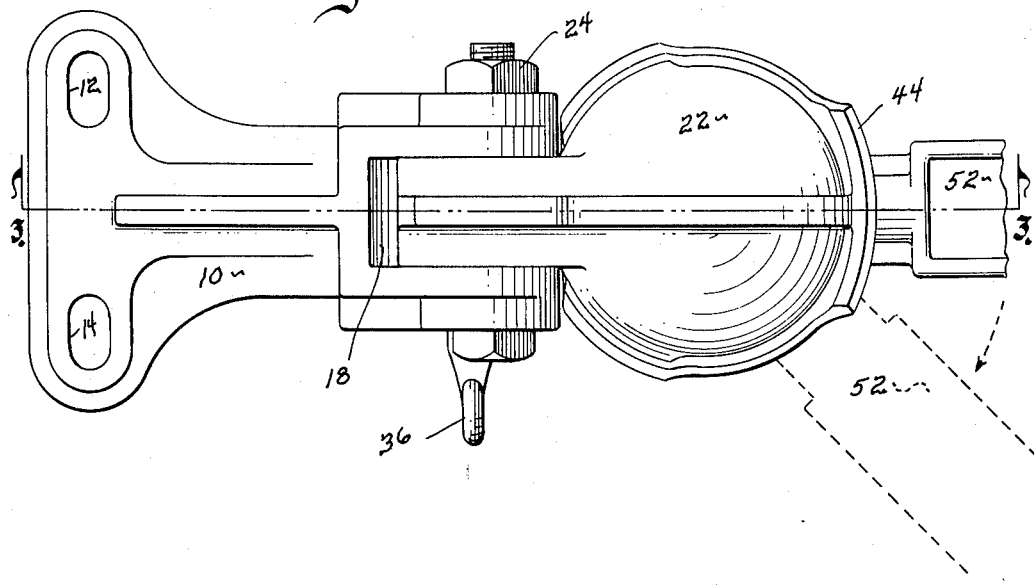

My invention consists in the construction, arrangement, and combination of the various parts of the device, whereby the objects contemplated are attained as hereinafter more fully set forth, pointed out in my claim, and illustrated in the accompanying drawings, in which:

Fig. 1 is a perspective view of my automatic ball and socket hitch,

Fig. 2 is a plan view of my automatic ball and socket type hitch with broken lines illustrating an adjusted position of the ball connection, Fig. 3 is a longitudinal sectional view of my ball and socket type hitch and showing the entry of the ball into the socket. The figure is taken on the line 3—3 of Fig. 2. Dotted lines illustrate the drawbar of a draft vehicle and a means of securing the socket thereto, Fig. 4 is a side elevation view of my ball and socket type hitch illustrating the ball just engaging socket and with a broken line arrow indicating the direction of movement of the ball to engage the socket. Dotted lines illustrate the drawbar of a draft vehicle and a means of securing the socket thereto.

Fig. 5 is a fragmentary cross sectional view of the socket taken on the line 5—5 of Fig. 4 and illustrating the operation of the locking mechanism. Broken lines illustrate the locked position while solid lines disclose the unlocked position.

Referring to the drawings, I have used the numeral 10 to designate a drawbar attaching portion of the main frame or body of my hitch. A pair of elongated holes are provided in portion 10 to permit the securement of the hitch to a tractor drawbar or similar object. These holes are designated by the numerals 12 and 14 respectively. Secured to this body portion 10 is the fixed socket half designated 16. This socket half is provided with a channel or longitudinal slot designated by the numeral 18 which extends toward the portion of the body or frame of the hitch that is secured to a drawbar. Near the socket itself, this longitudinal slot is made deeper and thereby forms the shoulder designated 20. A movable socket half designated 22 is pivotally secured to the frame and body half 16 in any suitable manner such as the nut and bolt assembly 24. The portion of the movable socket half 22 which extends into the vertical longitudinal slot 18 is formed into a tongue designated 26, which is so formed that it will lie flush with the interior portions of the fixed socket half 16 when the hitch is closed, but will protrude into the interior of the socket half 16 when the hitch is open, as clearly shown in Fig. 3.

At the portion of the movable socket half that extends most deeply into the vertical longitudinal slot 18 is a boss or shoulder designated 28. A transverse vertical slot designated 30 intersects the slot 18 at a point just to the rear of boss 28 when the socket is closed. A locking pin or lever designated 32 is pivotally secured in the transverse slot 30, and its outer end is constantly being urged downward by the spring element designated 34. When the socket is closed, the spring 34 can urge the end of lever 32 into a position between the shoulders 20 and 28. When the locking pin 32 is in such a position, any attempt to move socket half 22 will be prevented, since body 28 cannot move the locking pin against the support offered by shoulder 20. This locked position is clearly disclosed by the broken line illustrated in Fig. 5. When the locking pin is moved to the position shown by solid lines in that figure, however, as by a pull exerted on ring 36, the spring 34 yields and permits locking lever 32 to withdrawn from between the shoulders 28 and 20, thus permitting movable socket half 22 to hinge upwardly, as shown in Fig. 3. The lever 32 may be pivotally mounted in any suitable manner, as by the pin 38, for example, while the spring 34 engages at one end the pierced ear 40 and hooks on to boss 42 at its other end. The socket portions 22 and 20 have outwardly curving lips at their rear ends designated by the numeral 44. The socket portions are also provided with cooperating ridges designated 46 and 48 for socket half 16 and 22 respectively, which aid in holding the socket half in an aligned position whenever the hitch is closed. A suitable ball of any nature, such as the one designated 50, is provided to engage the socket. The tongue designated 52 and provided with holes 54 are a convenient means for securing the ball to any vehicle that is to be drawn. As shown in Fig. 3 and Fig. 4, the drawbar designated 56 is aligned more easily by reason of the shoulder 58 formed on the bottom of frame element 10. The entire socket portion of the hitch is rigidly secured to a draft vehicle in any suitable manner, as, for example, by the nut and bolt assembly 60.

The operation of my hitch is very simple in that the operator is merely required to exert an upward force on ring 36 at the time that the ball 50 either engages or disengages the socket. Once the ball has forced the socket open and entered it, as shown in Fig. 3, gravity will generally cause the movable socket half to fall to a closed position. In the event that the angle at which the draft and drawn vehicles approach each other should tend to interfere with this gravitational closing, however, other means have been provided for positively closing the hitch. Since tongue 26 protrudes into the socket interior, the force of ball 50 striking this tongue will positively close the movable socket half 22 whenever complete contact is established. This positive closing action will not only solve the problem mentioned previously but also will overcome any binding of socket half 22 resulting from exposure to the elements or from minor imperfections in the manufacture of the socket. As soon as contact is established between the ball and socket, and the movable jaw or socket half 22 has been forced open even part way, the operator may release his pull on ring 36 and when jaw 22 closes completely the spring 34 will cause the locking pin to insert itself between the shoulders 20 and 28, thereby positively locking the ball 50 inside the socket.

The advantages that flow from my structure are numerous. In the first place, the only moving parts in the socket portion of the hitch are the locking lever and the movable jaw. The entire device, including the ball, is composed of only four castings and the standard bolt, pin and spring. It is obvious, therefore, that this hitch can be manufactured and maintained for an absolute minimum cost. It is also clear that the operation of the device is substantially automatic and requires no manual manipulation to lock it. In spite of its extreme simplicity, therefore, it will function as effectively as the more complex hitches on the market and does not require that any person be forced to assume a dangerous position during the coupling or uncoupling of units employing this hitch. It is also very clear that a person totally unfamiliar with my hitch could learn to use it in a matter of minutes and that it requires no special training or skill on the part of the operator.

Some changes may be made in the construction and arrangement of my ball and socket type hitch without departing from the real spirit and purpose of my invention, and it is my intention to cover by my claim, any modified forms of structure or use of mechanical equivalents which may be reasonably included within its scope.

I claim:

A fixed socket half adapted to be secured to a drawbar and having a vertical longitudinal slot extending forwardly from its socket area, a movable socket half pivotally secured in the vertical longitudinal slot of said fixed socket half, a tongue integrally formed on the inner forward end of the socket area of said movable socket and capable of extending into the socket area of said two socket halves when said two socket halves are in open condition and to assume a position flush with the socket area of said two socket halves when the same are in closed condition; said fixed socket half having a transverse vertical slot therein that communicates with its longitudinal vertical slot, a locking pin pivotally secured in the transverse slot of said fixed socket half capable of engaging a portion of said movable socket half when in one position of its movement and thereby holding said movable socket half in a closed position relative to said fixed socket half, and a spring means for yieldingly holding said locking pin in engagement with said movable socket half; said socket halves having outwardly curving lips that cause the halves to be forced open by pressure of a ball against them when said movable socket half is not being engaged by said locking pin.

References Cited in the file of this patent

UNITED STATES PATENTS

| | | |
|---|---|---|
| 1,400,402 | Anderson | Dec. 13, 1921 |
| 2,115,629 | Gurley | Apr. 26, 1938 |

FOREIGN PATENTS

| | | |
|---|---|---|
| 809,600 | France | Mar. 6, 1937 |
| 882,585 | France | June 8, 1943 |
| 624,743 | Germany | Jan. 31, 1936 |
| 560,816 | Great Britain | Apr. 21, 1944 |